United States Patent
Xu

(10) Patent No.: US 10,928,211 B2
(45) Date of Patent: Feb. 23, 2021

(54) METHOD AND APPARATUS FOR SELECTIVELY QUALIFYING TRAJECTORIES IN REGARDS TO A DETERMINATION OF TRAVEL TIME FOR A MANEUVER

(71) Applicant: HERE Global B.V., Eindhoven (NL)

(72) Inventor: Bo Xu, Lisle, IL (US)

(73) Assignee: HERE GLOBAL B.V., Eindhoven (NL)

( * ) Notice: Subject to any disclaimer, the term of this patent is extended or adjusted under 35 U.S.C. 154(b) by 86 days.

(21) Appl. No.: 14/949,095

(22) Filed: Nov. 23, 2015

(65) Prior Publication Data
US 2017/0146355 A1  May 25, 2017

(51) Int. Cl.
*G01C 21/34* (2006.01)
*G06G 7/76* (2006.01)
(Continued)

(52) U.S. Cl.
CPC ..... *G01C 21/3446* (2013.01); *G01C 21/3453* (2013.01)

(58) Field of Classification Search
CPC .... G01C 21/3446; G01C 21/26; G01C 21/32; G01C 21/34; H04L 45/00; H04L 12/733;
(Continued)

(56) References Cited

U.S. PATENT DOCUMENTS 6,385,539 B1 * 5/2002 Wilson ............... G01C 21/30
340/905
7,689,354 B2 * 3/2010 Heiniger ............. A01B 69/008
701/412
(Continued)

FOREIGN PATENT DOCUMENTS

WO  WO 2013/160471 A2  10/2013
WO  WO 2014/162169 A1  10/2014

OTHER PUBLICATIONS

Amin et al.; "Mobile Century—Using GPS Mobile Phones as Traffic Sensors: A Field Experiment"; 15th World Congress on Intelligent Transportation Systems; Nov. 16-20, New York; pp. 1-4.
(Continued)

*Primary Examiner* — Yuri Kan
(74) *Attorney, Agent, or Firm* — Alston & Bird LLP

(57) ABSTRACT

A method, apparatus and computer program product selectively qualify trajectories for utilization in regards to the determination of the travel time for a maneuver. In the context of a method, it is determined whether a trajectory intersects both first and second gate lines disposed at opposite ends of a maneuver that includes first and second sections. If the trajectory intersects both the first and second gate lines, the method determines whether a candidate probe point is within a respective distance threshold of at least one of the first section or the second section. The method also includes selectively identifying the trajectory as either a qualified trajectory or a disqualified trajectory in regards to a determination of a travel time for the maneuver based upon whether the candidate probe point is determined to be within the respective distance threshold of at least one of the first section or the second section.

21 Claims, 14 Drawing Sheets

(51) Int. Cl.
*G01V 3/38* (2006.01)
*G01C 21/26* (2006.01)
*H04L 12/733* (2013.01)

(58) Field of Classification Search
CPC .. G06T 17/20; G06G 7/76; G01V 3/38; G06F 165/00
See application file for complete search history.

(56) References Cited

U.S. PATENT DOCUMENTS

| | | | | |
|---|---|---|---|---|
| 8,145,367 | B2* | 3/2012 | Khatwa | G08G 5/025 |
| | | | | 701/120 |
| 8,566,016 | B2* | 10/2013 | Law | G08G 5/065 |
| | | | | 701/1 |
| 8,606,498 | B2* | 12/2013 | Pesterev | G01C 21/16 |
| | | | | 701/400 |
| 2007/0129892 | A1* | 6/2007 | Smartt | G01C 21/3844 |
| | | | | 702/5 |
| 2008/0103694 | A1* | 5/2008 | Dix | A01B 69/008 |
| | | | | 701/425 |
| 2009/0005958 | A1* | 1/2009 | Roesser | G08G 1/20 |
| | | | | 701/117 |
| 2012/0022781 | A1 | 1/2012 | Wilson | |
| 2012/0095682 | A1* | 4/2012 | Wilson | G01C 21/32 |
| | | | | 701/532 |
| 2012/0239287 | A1* | 9/2012 | Pieper | G05D 1/0212 |
| | | | | 701/400 |
| 2014/0222322 | A1* | 8/2014 | Durekovic | G08G 1/161 |
| | | | | 701/117 |
| 2014/0278052 | A1* | 9/2014 | Slavin | G01C 21/3492 |
| | | | | 701/400 |
| 2015/0134850 | A1* | 5/2015 | Rolf | H04L 45/126 |
| | | | | 709/241 |
| 2015/0211871 | A1* | 7/2015 | Jeong | G01C 21/34 |
| | | | | 701/522 |
| 2015/0356771 | A1 | 12/2015 | Xu et al. | |

OTHER PUBLICATIONS

Ban et al.; "Delay Pattern Estimation for Signalized Intersections Using Sampled Travel Times"; Transportation Research Record; Journal of the Transporation Resarch Board, No. 2130; Transportation Research Board of the National Academies; Washington, DC 2009; pp. 109-119.

Byon et al.; "Travel Time Collection and Traffic Monitoring Via GPS Technologies"; Proceedings of the IEEE ITSC 2006; 2006 IEEE Intelligent Transportation Systems Conference; Toronto, Canada, Sep. 17-20, 2006; pp. 677-682.

Hoh et al.; "Virtual Trip Lines for Distributed Privacy-Preserving Traffic Monitoring"; MobiSys '08; Jun. 17-20, 2008; pp. 1-14.

Liu et al.; "Intersection Delay Estimation From Floating Car Data Via Principal Curves: A Case Study on Beijing's Road Network"; Front. Earth Sci. 2013; 7(2): pp. 206-216.

Neumann et al.; "Computing Turn-Dependent Delay Times at Signalized Intersections Based on Floating Car Data"; Association for the European Transport and Contributors; 2010; pp. 1-11.

Quddus et al.; "Shortest Path and Vehicle Trajectory Aided Map-Matching for Low Frequency GPS Data"; Transportation Research Part C 55 (2015) 328-339.

Wang et al.; "Estimation Trajectory of the Low-Frequency Floating Car Considering the Traffic Control"; Mathematical Problems in Engineering; vol. 2013; Article ID 762924; 11 pages.

Winter et al.; "Modeling Costs of Turns in Route Planning"; GeoInformatica, 6(4):345-361, 2002.

Work et al.; "An Ensemble Kalman Filtering Approach to Highway Traffic Estimation Using GPS Enabled Mobile Devices"; Proceedings of the 47th IEEE Conference on Decision and Control; Cancun, Mexico, Dec. 9-11, 2008; pp. 5062-5068.

Yang et al.; "Using Incomplete Information for Complete Weight Annotation of Road Networks"; IEEE Transaction on Knowledge and Data Engineering; vol. 26, No. 5; May 2014; pp. 1267-1279.

* cited by examiner

METHOD AND APPARATUS FOR SELECTIVELY QUALIFYING TRAJECTORIES IN REGARDS TO A DETERMINATION OF TRAVEL TIME FOR A MANEUVER

TECHNICAL FIELD

A method, apparatus and computer program product are provided in accordance with an example embodiment in order to selectively identify a trajectory in regards to the determination of travel time for a maneuver and, more particularly, to selectively identify a trajectory in regards to the determination of the travel time for a maneuver based upon respective locations of one or more candidate probe points.

BACKGROUND

Delays associated with the traversal of intersections can contribute significantly to the overall travel time, particularly in urban settings. In route planning, the delays associated with the traversal of an intersection may be taken into account by adding a fixed cost, such as a predefined amount of time, for execution of a turn at an intersection. For example, route planning may add 15 seconds for a right turn and 30 seconds for a left turn at a particular intersection. While accounting for the delay associated with an intersection with a fixed cost provides for relatively simple processing, the utilization of a fixed cost for a turn at an intersection does not necessarily accurately represent the time expended to actually execute a turn at the intersection. Instead, the time incurred to execute a turn may depend on many factors including the traffic volume, traffic light timing, turn angle, etc. Further, the addition of a fixed cost for a turn may result in the time expended to execute the turn being double counted when the fixed cost for a turn is added to the costs associated with the links that lead toward and away from the intersection.

By way of example, an intersection is depicted in FIG. 1. As shown, a vehicle makes a right turn from a first link L1 to a second link L2 at node B. In this regard maneuver m(L1→L2) represents a right turn at node B from link L1 to link L2. For route planning, the cost and therefore the time associated with travel from node A to node C including a right turn at node B can be represented as cost(A→C)=cost(L1)+cost(L2)+cost(m(L1→L2)). However, the cost associated with the traversal of the first link L1, that is, cost(L1), already contains a portion of the time that vehicles expend to execute the right turn at node B by including the time associated with the vehicle slowing down and waiting in queue on the first link L1. Thus, cost(L1) partially captures the cost associated with the right turn. Similarly, the cost associated with the traversal of the second link L2, that is, cost(L2), contains at least some of the time that the vehicle expends executing the right turn at node B by including the time expended to accelerate on the second link L2 following the turn. Thus, cost(L2) partially captures the cost associated with the right turn at node B. Thus, the foregoing mathematical relationship that defines cost(A→C) effectively double counts the cost associated with the right turn at node B.

Various methods have been developed in order to estimate the time expended for the traversal of an intersection. For example, the delays associated with the traversal of an intersection may be evaluated by fixed sensors, such as loop detectors, ultra-sonic vehicle detectors or cameras. However, fixed sensors may sometimes be expensive to deploy and maintain. Additionally, fixed sensors usually cover only a small portion of a transportation network, such as selected highway segments.

Another technique to evaluate the delays associated with the traversal of an intersection is microscopic traffic simulations. However, microscopic traffic simulations need the reliable calibration of parameters, such as traffic arrival rate, the distribution of turns, traffic flow rules and car following rules. These parameters may be difficult to calibrate, resulting in corresponding difficulties in accurately evaluating the delays associated with the traversal of an intersection via microscopic traffic simulations.

Techniques for evaluating the delays associated with the traversal of an intersection may also utilize trajectories, that is, the path of a vehicle as the vehicle proceeds through the intersection. In one such technique, the boundary of an intersection is defined by a circle centered at the center of the intersection. Delays associated with the traversal of the intersection may then be determined based upon the time expended from a vehicle entering through the boundary to the vehicle exiting through the boundary. However, the circle encloses not only the intersection, but also areas that do not belong to the intersection. For example, the circle may include parking lots adjacent to the intersection or retail establishments near the intersection. As such, a vehicle may remain within the boundary, but outside of the actual intersection during a visit to one of the retail establishments. While not representative of the time required to traverse the intersection, the time expended by the vehicle within the boundary but outside of the intersection is generally counted toward the delays associated with the traversal of the intersection, thereby introducing inaccuracies in the determination of the time expended to traverse the intersection.

In another technique, the boundaries of an intersection are defined utilizing virtual trip lines. A virtual trip line is an artificial line segment that crosses a road. When a vehicle passes a virtual trip line, the time is recorded. The travel time for the intersection is determined as the length of time from when a vehicle passes one virtual trip line until the same vehicle passes another virtual trip line. As with the use of a circle to define the boundary about an intersection, however, the use of virtual trip lines also introduces inaccuracies in instances in which vehicles pass a first vehicle trip line but then remain outside of the intersection for some period of time prior to exiting through another virtual trip line. For example, a vehicle may pass a first virtual trip line and then pull to the side of the road for an extended period of time prior to reentering the traffic flow and passing a second virtual trip line. The time that such a vehicle expends between the virtual trip lines, but outside of the intersection is generally included within the delay associated with traversal of the intersection, thereby leading to inaccuracies in the determination of the time expended to traverse the intersection.

Further, gated bounding polygons may be utilized to qualify turning trajectories to either be included in the determination of the time expended to traverse an intersection or to be excluded from such a determination. In relation to the use of gated bounding polygons, a virtual bounding polygon is constructed to enclose an intersection. The sides of the polygon that cross the roads that enter and exit the intersection are designated to be gates. A trajectory is considered to be a turning trajectory in this technique if and only if a trajectory enters the gated bounding polygon at one gate and exits the gated bounding polygon at another gate with all probe points associated with the vehicle between the entry and exit through the gated bounding polygon falling within the gated bounding polygon. The use of a gated bounding polygon prevents the vehicles that move off of the road and remain outside of the intersection from being included in the estimation of the delays associated with the traversal of the intersection. However, the use of gated bounding polygons may require a computationally complex construction of the bounding polygon including the union of multiple polygons.

In another route planning technique, the delays associated with the traversal of the turn are incorporated by transforming the graphical representation of a road network to a line graph. In this technique, a road network G is transformed to a line graph L(G). The line graph L(G) is a graph that has a node corresponding to each link of the road network G, and a link joining the neighboring links in the road network G. The link cost in the road network G is represented by the node cost in the line graph L(G) and the turn cost in the road network G is represented by the link cost in the line graph L(G). Route planning may then be performed utilizing the line graph L(G). In this regard, delays associated with the traversal of a turn are incorporated in a manner that permits the shortest path algorithms to be executed without modification. However, this technique still determines the path delay by adding both the link delay and the turn delay, thereby potentially resulting in a double counting of the turn delay which, in turn, may introduces inaccuracies in relation to the resulting determination of the turn delay.

BRIEF SUMMARY

A method, apparatus and computer program product are provided in accordance with an example embodiment in order to selectively qualify trajectories for utilization in regards to the determination of the travel time for a maneuver, such as the travel time associated with the execution of a turn at an intersection. By selectively qualifying the trajectories, the method, apparatus and computer program product of an example embodiment may utilized only those trajectories that accurately represent the travel time for the for the maneuver, such as a turn, and may disqualify from consideration those trajectories that do not accurately represent the travel time for the maneuver, such as those trajectories that include a vehicle parked at the side of the road proximate an intersection for some period of time or a vehicle parked at a retail establishment or a parking lot located proximate an intersection. Thus, the resulting travel time determined for the maneuver, such as the travel time associated with the traversal of an intersection, may be more accurately determined for route planning purposes.

In an example embodiment, a method is provided that includes determining whether a trajectory intersects both first and second gate lines disposed at opposite ends of a maneuver. The maneuver is comprised of at least first and second sections. In an instance in which the trajectory intersects both the first and second gate lines, the method determines whether a candidate probe point is within a respective distance threshold of at least one of the first section or the second section. The method also includes selectively identifying the trajectory as either a qualified trajectory or a disqualified trajectory in regards to a determination of a travel time for the maneuver based upon whether the candidate probe point is determined to be within the respective distance threshold of at least one of the first section or the second section.

The maneuver may be further comprised of one or more internal links disposed between the first and second sections. The method of this example embodiment determines whether a candidate probe point is within a respective distance threshold of at least one of the first section or the second section by determining whether the candidate probe point is within the respective distance threshold of at least one of the first or second sections or the one or more internal links. The method of this example embodiment also selectively identifies the trajectory as either a qualified trajectory or a disqualified trajectory based upon whether the candidate probe point is determined to be within the respective distance threshold of at least one or the first or second sections or the one or more internal links.

The first section may be associated with a first distance threshold and the second section may be associated with a second distance threshold. The method of this example embodiment determines whether a candidate probe point is within the respective distance threshold of at least one of the first section or the second section by determining whether the candidate probe point is within at least one of the first distance threshold of the first section or the section distance threshold of the second section.

The method of an example embodiment also includes determining a first time at which the trajectory intersects the first gate line and a section time at which the trajectory intersects the second gate line. The method of this example embodiment also includes identifying each probe point of the trajectory that is associated with the time value that is between the first and second times as a candidate probe point. In this example embodiment, the method may determine whether a candidate probe point is within a respective distance threshold of at least one of the first section or the second section by separately determining for each candidate probe point whether the respective candidate probe point is within a respective distance threshold of at least one of the first section or the second section. The method of this example embodiment also selectively identifies the trajectory as either a qualified trajectory or a disqualified trajectory by identifying the trajectory as a qualified trajectory in an instance in which each of the candidate probe points of the trajectory satisfies a respective distance threshold and by identifying the trajectory as a disqualified trajectory in an instance in which at least one of the candidate probe points of the trajectory fails to satisfy a respective distance threshold.

The distance threshold may be dependent upon the number of lanes of a respective section, the width of each lane of the respective section and a measure of a positioning error that are associated with the candidate probe point. The method of an example embodiment may also include defining the first and second gate lines based upon the respective distance threshold of at least one of the first section or the second section.

In another example embodiment, an apparatus is provided that includes at least one processor and at least one memory storing computer program code with the at least one memory and the computer program code configured to, with the processor, cause the apparatus to at least determine whether a trajectory intersects both the first and second gate lines disposed at opposite ends of the maneuver. The maneuver is comprised at least of first and second sections. The at least one memory and the computer program code are further configured to, with the processor, cause the apparatus to determine, in an instance in which the trajectory intersects both the first and second gate lines, whether a candidate probe point is within a respective distance threshold of at least one of the first section or the second section. The at least one memory and the computer program code are further configured to, with the processor, cause the apparatus to selectively identify the trajectory as either a qualified trajectory or a disqualified trajectory in regards to a determination of a travel time for the maneuver based upon whether the candidate probe point is determined to be within the respective distance threshold of at least one of the first section or the second section.

In an example embodiment, the maneuver is further comprised of one or more internal links disposed between the first and second sections. The at least one memory and the computer program code are configured to, with the processor, cause the apparatus of this example embodiment to determine whether a candidate probe point is within a respective distance threshold of at least one of the first section or the second section by determining whether the candidate probe point is within a respective distance threshold of at least one of the first or second sections or the one or more internal links. The at least one memory and the computer program code are configured to, with the processor, cause the apparatus of this example embodiment to selectively identify the trajectory as either a qualified trajectory or a disqualified trajectory based upon whether the candidate probe point is determined to be within the respective threshold distance of at least one of the first or second sections or the one or more internal links.

The first section may be associated with the first distance threshold and the second section may be associated with a second distance threshold. The at least one memory and the computer program code are configured to, with the processor, cause the apparatus of this example embodiment to determine whether a candidate probe point is within the respective distance threshold of at least one of the first section or the second section by determining whether the candidate probe point is within at least one of the first distance threshold of the first section or the second distance threshold of the second section.

The at least one memory and the computer program code are configured to, with the processor, cause the apparatus of an example embodiment to determine a first time at which the trajectory intersects the first gate line and the second time at which the trajectory intersects the second gate line. The at least one memory and the computer program code are configured to, with the processor, cause the apparatus of this example embodiment to identify each probe point of the trajectory that is associated with a time value that is between the first and second times of the candidate probe point. The at least one memory and the computer program code may be configured to, with the processor, cause the apparatus of this example embodiment to determine whether a candidate probe point is within a respective distance threshold of at least one of the first section or the second section by separately determining for each candidate probe point whether the respective candidate probe point is within the respective distance threshold of at least one of the first section or the second section. The at least one memory and the computer program code are configured to, with the processor, cause the apparatus of this example embodiment to selectively identify the trajectory as either a qualified trajectory or a disqualified trajectory by identifying the trajectory as a qualified trajectory in an instance in which each of the candidate probe points of the trajectory satisfies a respective distance threshold and identifying the trajectory as a disqualified trajectory in an instance in which at least one of the candidate probe points of the trajectory fails to satisfy a respective distance threshold.

The distance threshold may be dependent upon the number of lanes of a respective section, the width of each lane of the respective section and a measure of a positioning error associated with the candidate probe point. The at least one memory and the computer program code may be configured to, with the processor, cause the apparatus of an example embodiment to define the first and second gate lines based upon the respective distance threshold of at least one of the first section or the second section.

In a further example embodiment, a computer program product is provided that includes at least one non-transitory computer-readable storage medium having computer-executable program code instructions stored therein with the computer-executable program code instructions including program code instructions configured to determine whether a trajectory intersects both first and second gate lines disposed at opposite ends of the maneuver. The maneuver is comprised of at least first and second sections. The computer-executable program code instructions also include program code instructions configured to determine, in an instance in which the trajectory intersects both the first and second gate lines, whether a candidate probe point is within a respective distance threshold of at least one of the first section or the second section. The computer-executable program code instructions further include program code instructions configured to selectively identify the trajectory as either a qualified trajectory or a disqualified trajectory in regards to a determination of a travel time for the maneuver based upon whether the candidate probe point is determined to be within the respective distance threshold of at least one of the first section or the second section.

The maneuver may be further comprised of one or more internal links disposed between the first and second sections. In this example embodiment, the program code instructions configured to determine whether a candidate probe point is within a respective distance threshold of at least one of the first section or the second section include program code instructions configured to determine whether the candidate probe point is within a respective distance threshold of at least one of the first or second sections or the one or more internal links. In this example embodiment, the program code instructions configured to selectively identify the trajectory as either a qualified trajectory or a disqualified trajectory include program code instructions configured to selectively identify the trajectory as either a qualified trajectory or a disqualified trajectory based upon whether the candidate probe point is determined to be within the respective distance threshold of at least one of the first or second sections or the one or more internal links.

The first section may be associated with the first distance threshold and the second section may be associated with the second distance threshold. In this example embodiment, the program code instructions configured to determine whether a candidate probe point is within a respective distance threshold of at least one of the first section or the second section include program code instructions configured to determine whether the candidate probe point is within at least one of the first distance threshold of the first section or the second distance threshold of the second section. In an example embodiment, the distance threshold is dependent upon the number of lanes of a respective section, the width of each lane of the respective section and a measure of a positioning error associated with candidate probe point.

The computer-executable program code instructions of an example embodiment further include program code instructions configured to determine a first time at which the trajectory intersects the first gate line and a second time at which the trajectory intersects the second gate line. The computer-executable program code instructions of this example embodiment also include program code instructions configured to identify each probe point of the trajectory that is associated with a time value that is between the first and second times as a candidate probe point. The program code instructions configured to determine whether a candidate probe point is within a respective distance threshold of at least one of the first section or the second section may include program code instructions configured to separately determine for each candidate probe point whether the respective candidate probe point is within a respective distance threshold of at least one of the first section or the second section. The program code instructions configured to selectively identify the trajectory as either a qualified trajectory or a disqualified trajectory may include program code instructions configured to identify the trajectory as a qualified trajectory in an instance in which each of the candidate probe points of the trajectory satisfies the respective distance threshold and identifying the trajectory as a disqualified trajectory in an instance in which at least one of the candidate probe points of the trajectory fails to satisfy a respective distance threshold.

In yet another example embodiment, an apparatus is provided that includes means for determining whether a trajectory intersects both first and second gate lines disposed at opposite ends of a maneuver. The maneuver is comprised of at least first and second sections. The apparatus also includes means for determining, in an instance in which the trajectory intersects both the first and second gate lines, whether a candidate probe point is within a respective distance threshold of at least one of the first section or the second section. The apparatus further includes means for selectively identifying the trajectory as either a qualified trajectory or a disqualified trajectory in regards to a determination of a travel time for the maneuver based upon whether the candidate probe point is determined to be within a respective distance threshold of at least one of the first section or the second section.

BRIEF DESCRIPTION OF THE DRAWINGS

Figure 1:
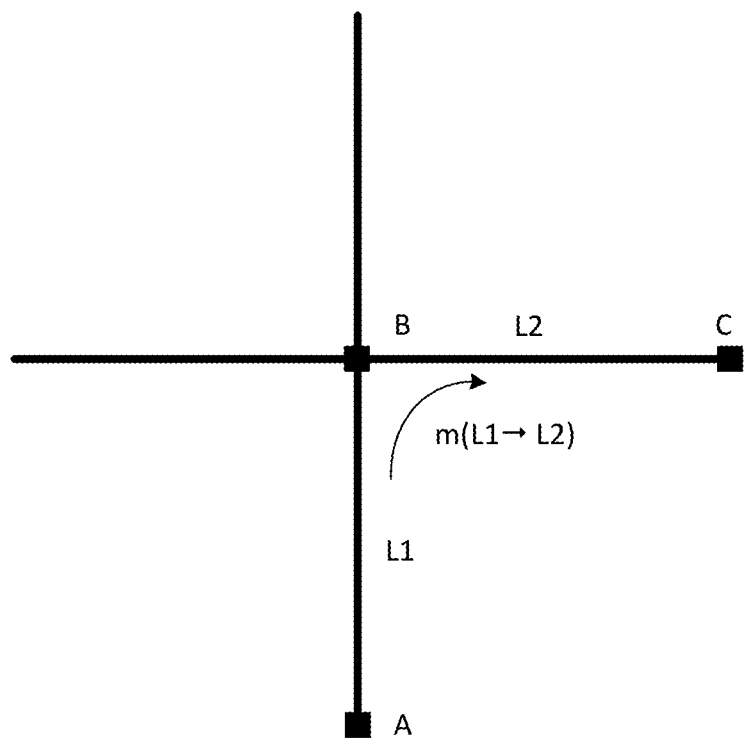
Figure 2:
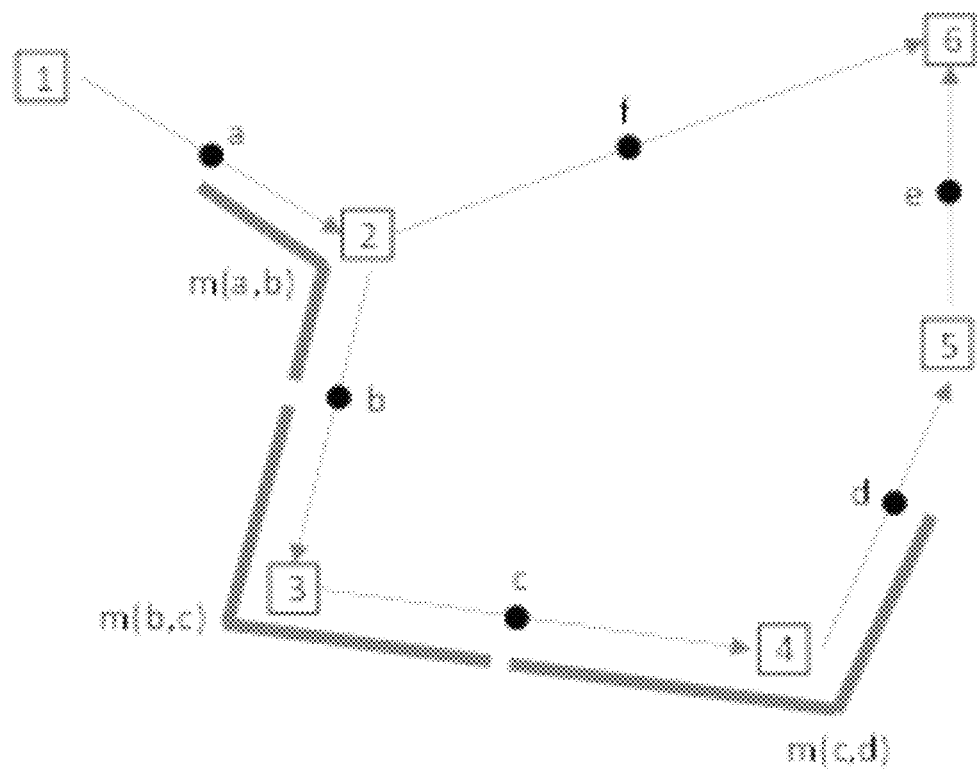
Figure 3:
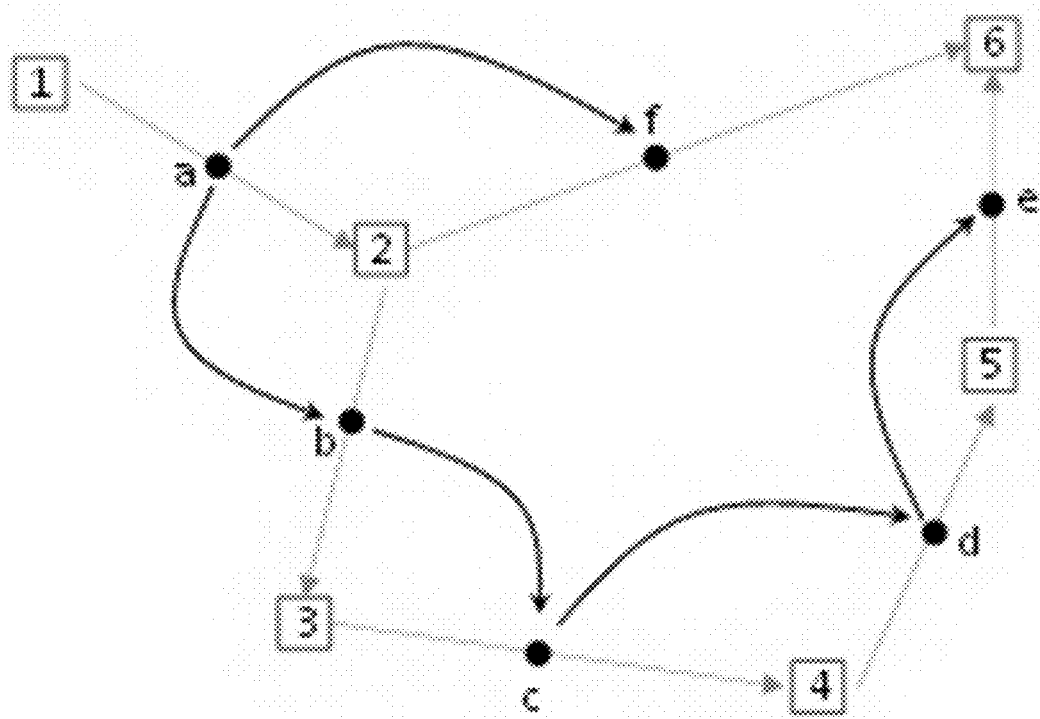
Figure 4:
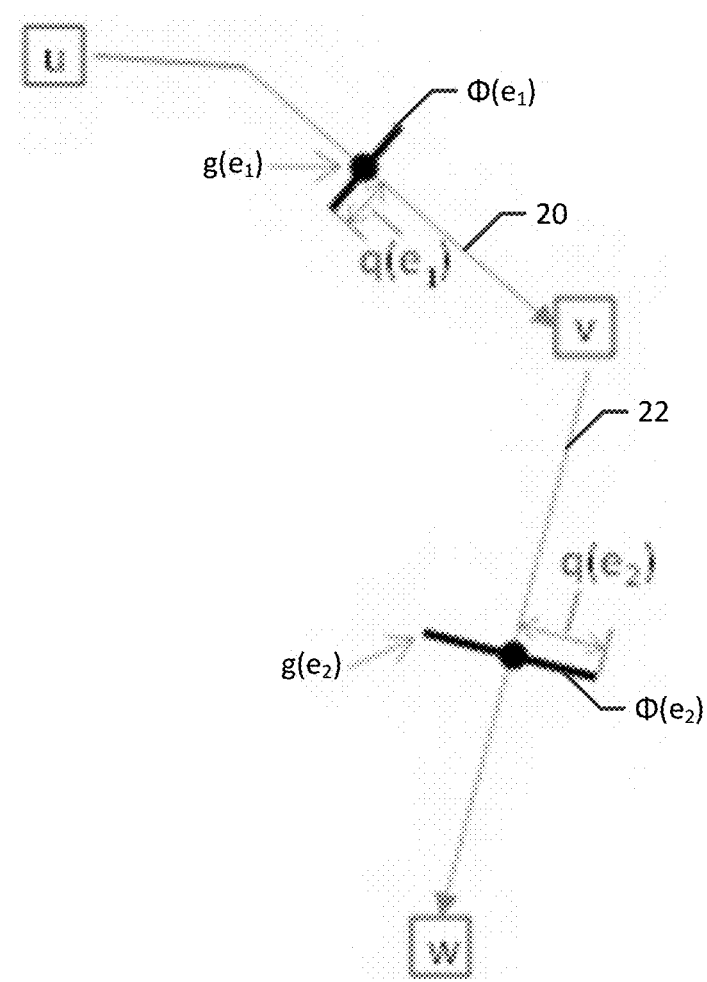
Figure 5:
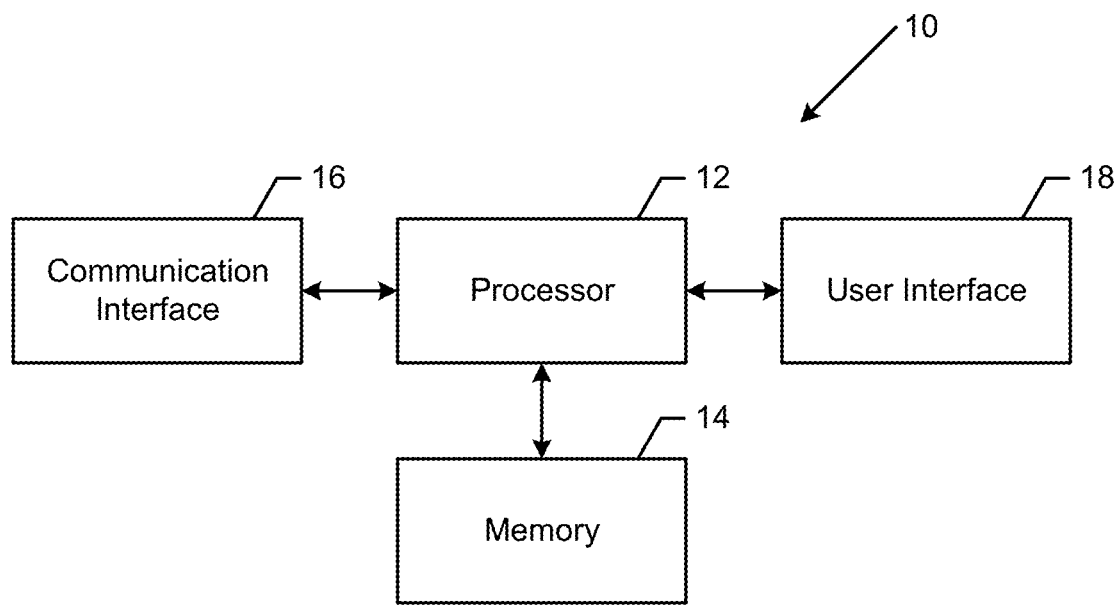
Figure 6:
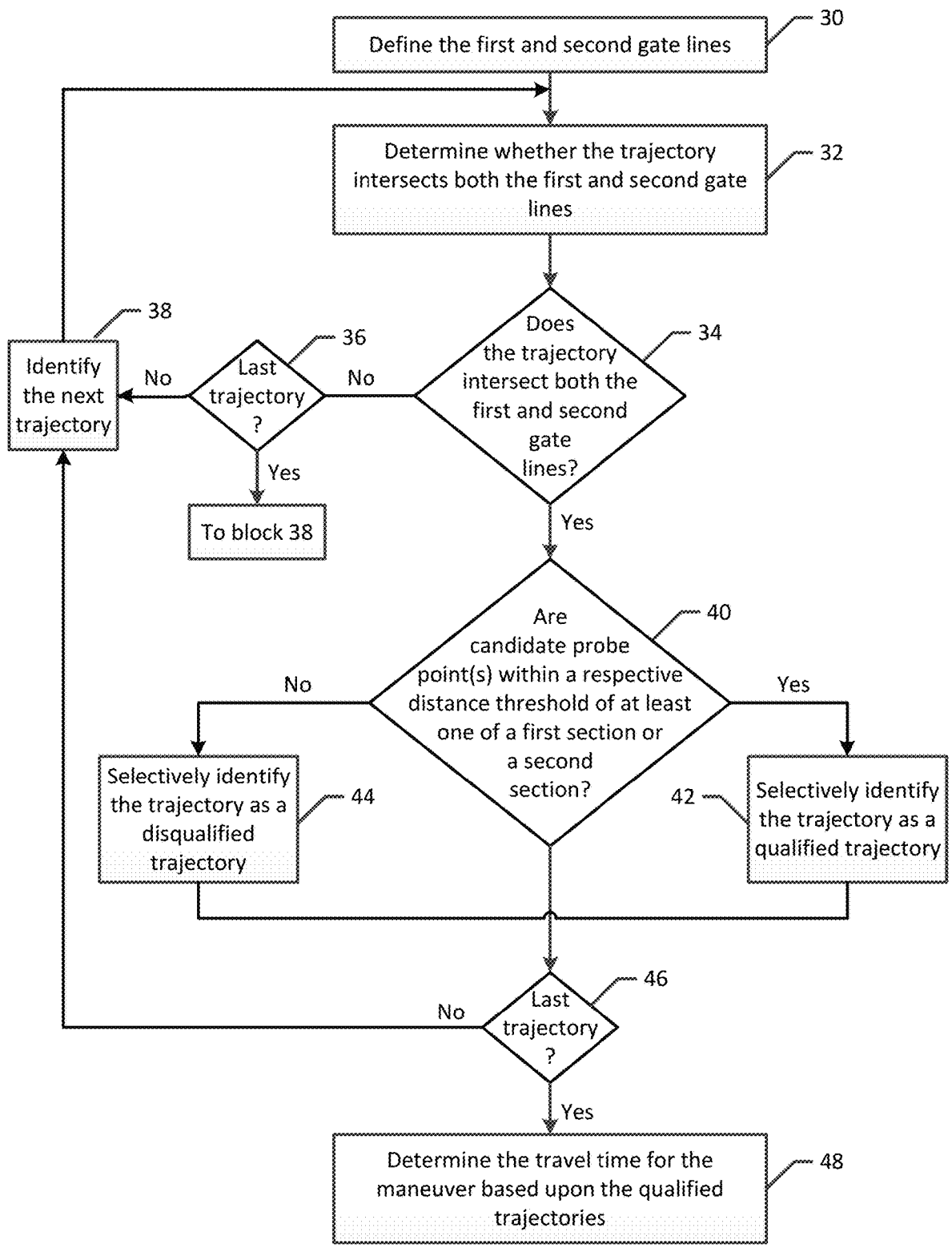
Figure 7:
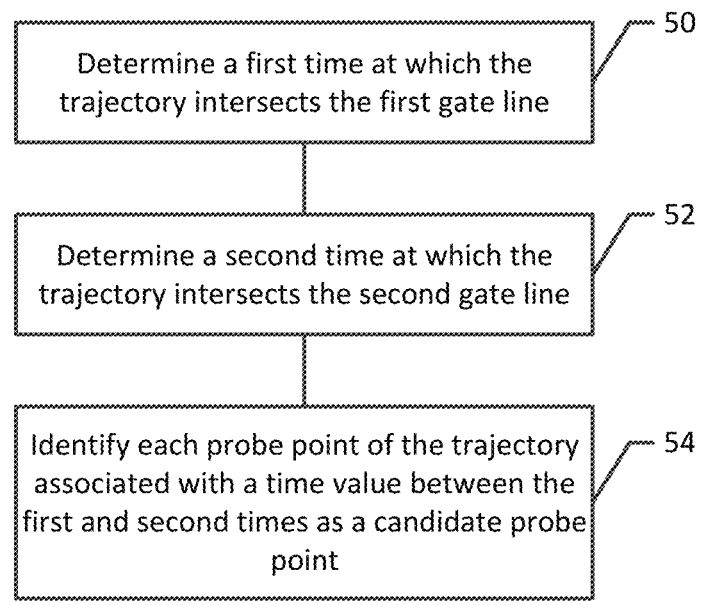
Figure 8:
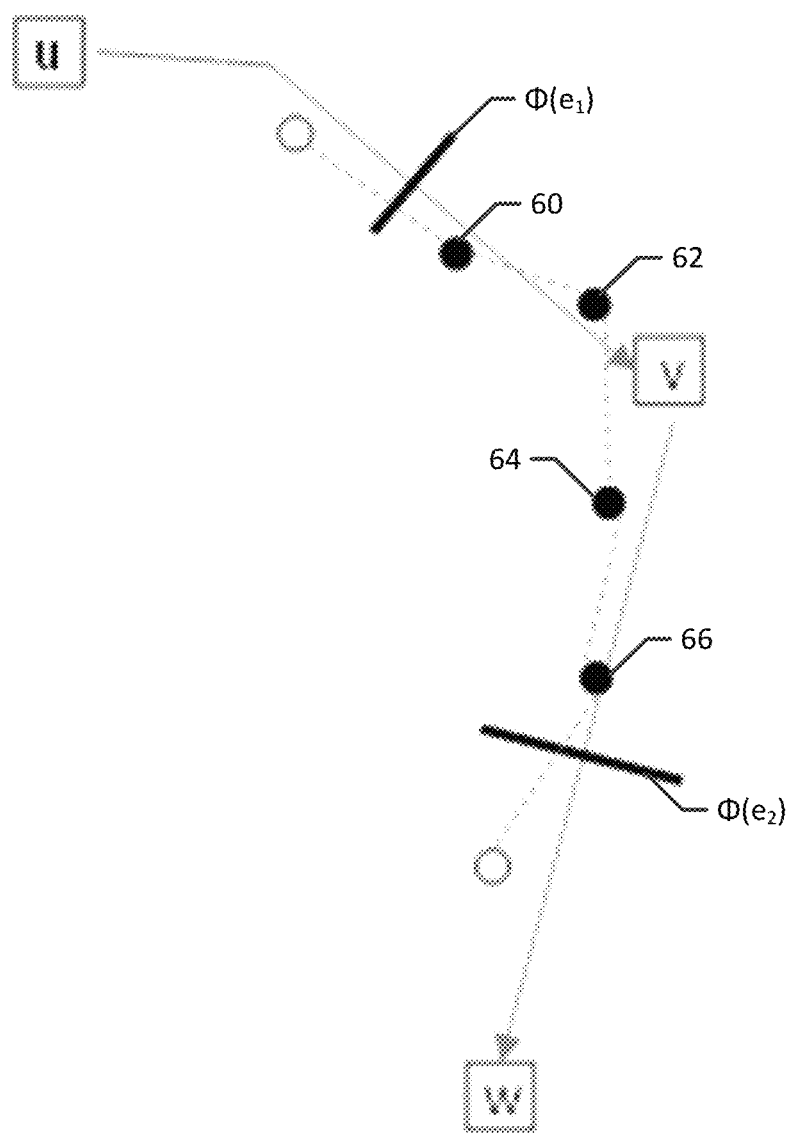
Figure 9:
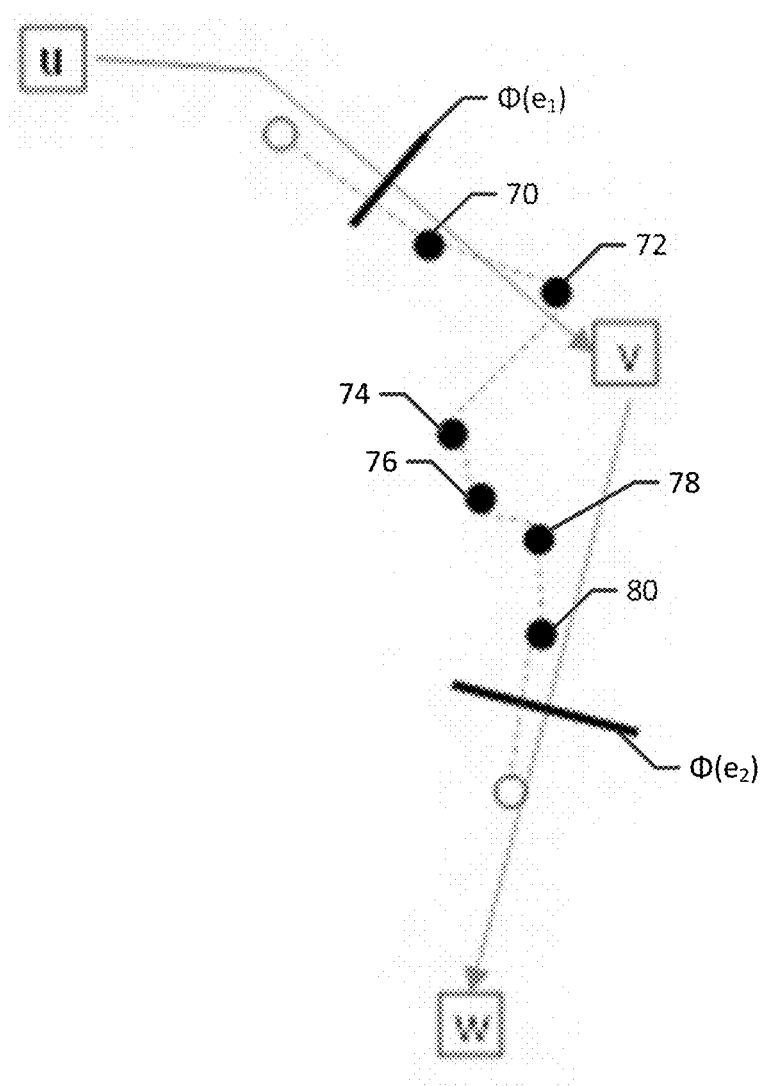
Figure 10:
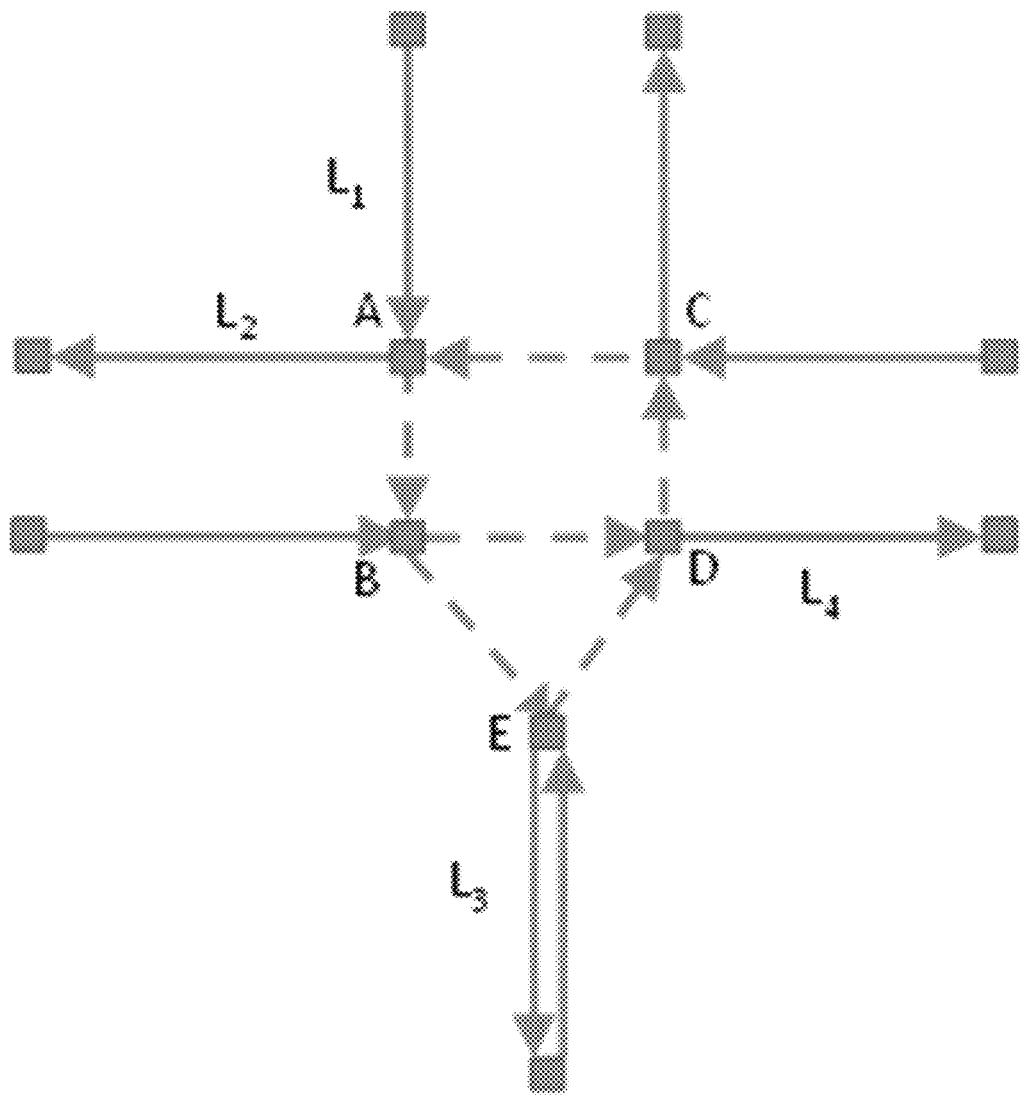
Figure 11:
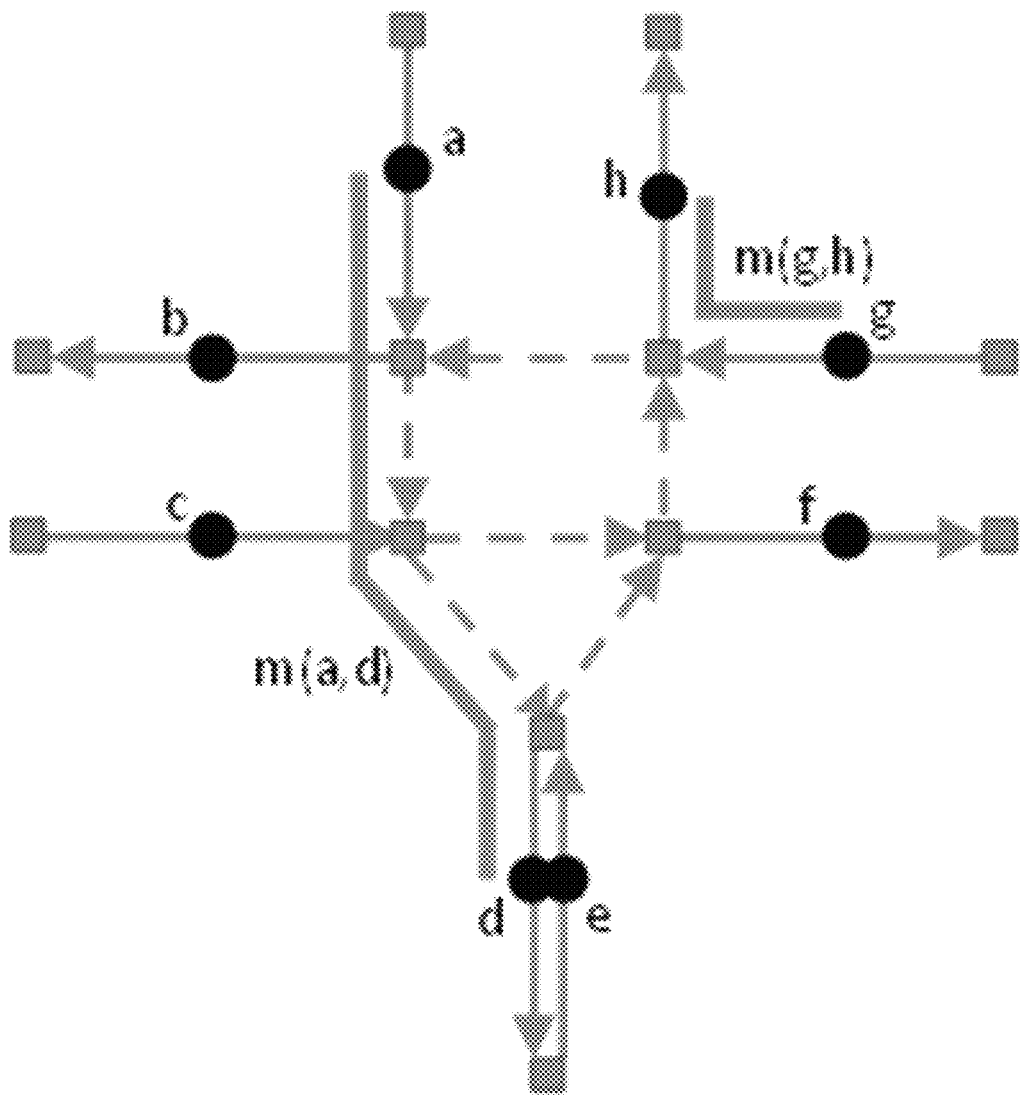
Figure 12:
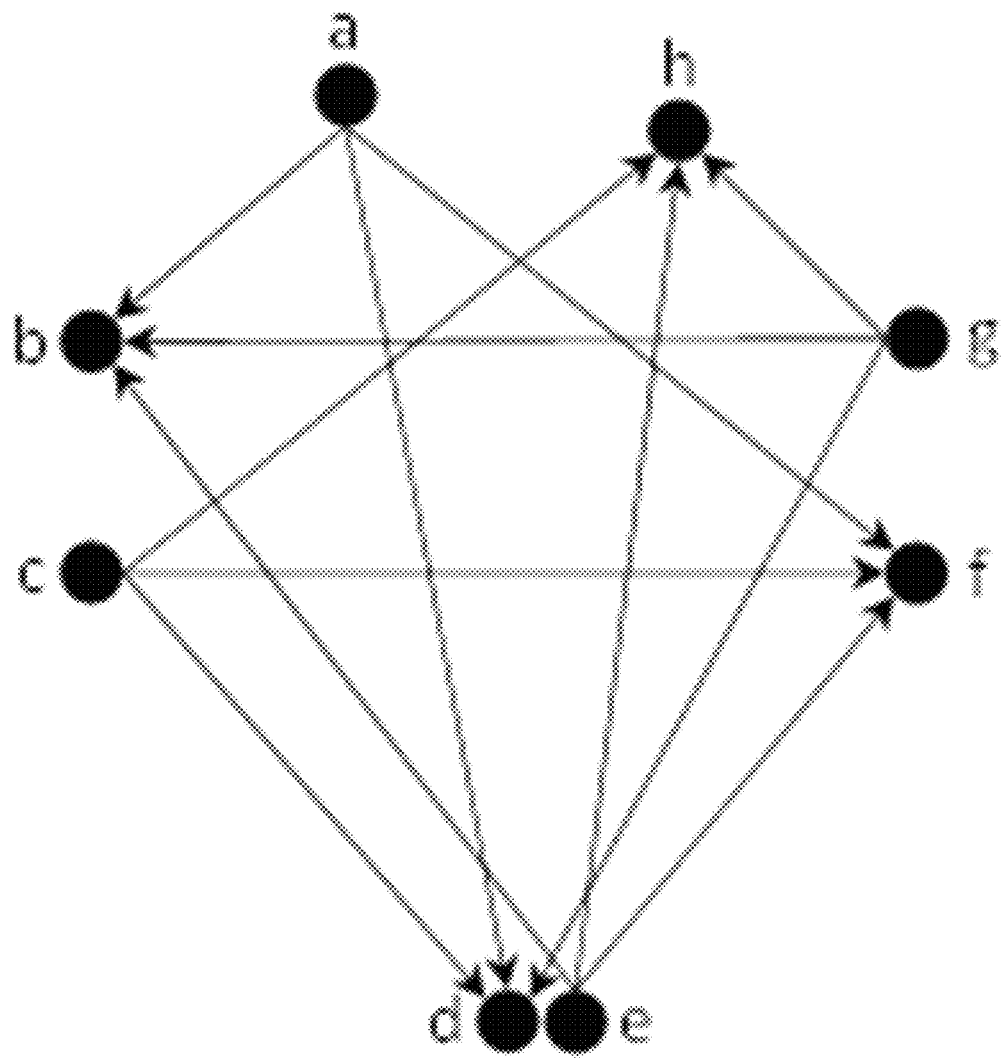
Figure 13:
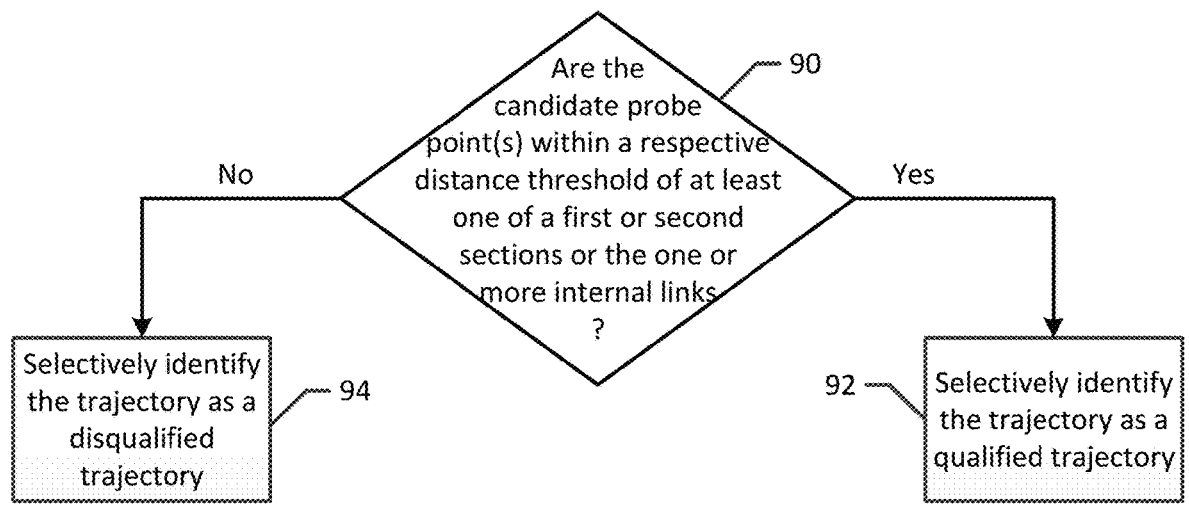
Figure 14:
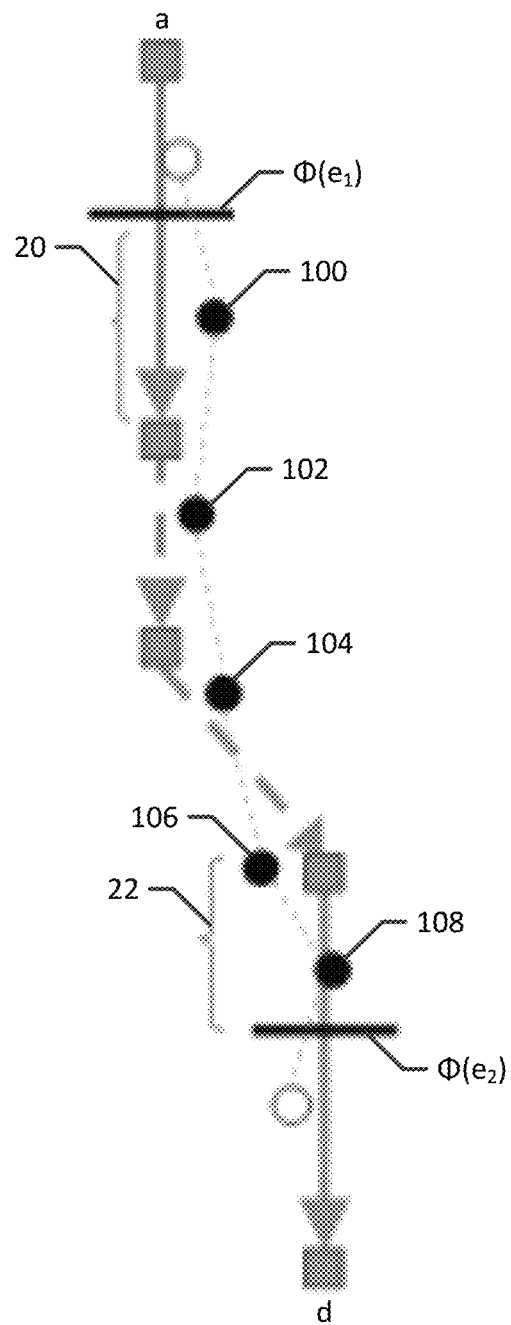

Having thus described certain example embodiments of the present disclosure in general terms, reference will hereinafter be made to the accompanying drawings, which are not necessarily drawn to scale, and wherein:

FIG. 1 is a representation of an intersection at which a right turn from a first link L1 to second link L2 is made;

FIG. 2 is a graphical representation of a portion of a road network;

FIG. 3 depicts a conversion of the graphical representation of the portion of the road network of FIG. 2 to a maneuver graph in accordance with an example embodiment of the present invention;

FIG. 4 is a graphical representation of the elements of a maneuver including first and second sections and first and second gate lines in accordance with an example embodiment of the present invention;

FIG. 5 is a block diagram of an apparatus that may be specifically configured in accordance with an example embodiment to the present invention;

FIG. 6 is a flowchart illustrating operations performed, such by the apparatus of FIG. 5, in accordance with an example embodiment of the present invention;

FIG. 7 is a flowchart illustrating operations performed, such by the apparatus of FIG. 5, in accordance with another example embodiment of the present invention;

FIG. 8 depicts a plurality of candidate probe points in relation to the graphical representation of the maneuver depicted in FIG. 4 with the candidate probe points representing a qualified trajectory in accordance with an example embodiment of the present invention;

FIG. 9 depicts a plurality of candidate probe points in relation to the graphical representation of the maneuver depicted in FIG. 4 with the candidate probe points representing a disqualified trajectory in accordance with an example embodiment of the present invention;

FIG. 10 is a graphical representation of an intersection including a set of nodes connected by internal links in accordance with another example embodiment of the present invention;

FIG. 11 illustrates two maneuvers m(a, d) and m(g, h) executed at the intersection depicted in FIG. 10;

FIG. 12 is a representation of a maneuver graph of the intersection of FIGS. 10 and 11 in accordance with another example embodiment of the present invention;

FIG. 13 is a flowchart illustrating operations performed, such as by the apparatus of FIG. 4, in accordance with another example embodiment of the present invention; and FIG. 14 depicts a plurality of candidate probe point in relation to maneuver m(a, d) of FIG. 11 with the candidate probe points representing a qualified trajectory in accordance with another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to selectively qualify trajectories in regards to the determination of a travel time for a maneuver, such as for a turn at an intersection. By selectively qualifying trajectories in regards to the determination of the travel time for a maneuver, the resulting travel time that is determined for the maneuver may more accurately represent the actual travel time as trajectories that do not accurately represent the travel time associated with the maneuver are disqualified and, therefore, not used for the determination of the travel time. Consequently, route planning may be more accurate by taking into account the travel time associated with the maneuver, such as a turn at an intersection.

A road network may be represented as imbedded directed graph G=(V, E) that includes a set V of nodes in a set E of links. By way of example, FIG. 2 is a primal graph and depicts a graphical representation of a portion of a road network including nodes 1, 2, 3, 4, 5 and 6 with links between respective pairs of nodes. In this regard, each node v c V represents a location of the road network. A node may be located at an intersection, but may also be positioned at other locations along the road network as well. In an example embodiment, each link e=<u, v> represents the center line of a road segment that starts at node u and ends at node v.

In order to facilitate the determination of travel time for a maneuver, a maneuver graph M(G) may be derived, such as from a primal graph G as shown in FIG. 2. In order to derive a maneuver graph, for each link e in the primal graph G, a location along the link e is designated as the gate point of e and is designated g(e). In an example embodiment, the gate point is within an intermediate portion of link e and is not close to or proximate either end point of link e. For example, the midpoint of link e may be designated as the gate point g(e). For each link e, there is exactly one gate point g(e). For two links $e_1$=(u, v) and link $e_2$=(v, w) in the primal graph G, the maneuver from link $e_1$ to link $e_2$ is defined to be the path from $g(e_1)$ to $g(e_2)$ and is denoted as maneuver m($g(e_1)$, $g(e_2)$). By way of example, FIG. 2 depicts three maneuvers m(a, b), m(b, c) and m(c, d). Thus, a route from point a to point d can be represented as a sequence of concatenated maneuvers m(a, b), m(b, c) and m(c, d).

A maneuver graph M(G) may therefore be constructed from the primal graph G. The maneuver graph M(G)=($V_M$, $E_M$) is a directed graph including a set $V_M$ of nodes and a set $E_M$ of links as shown by the curved lines in FIG. 3. Each node v∈$V_M$ corresponds to a gate point in the primal graph G. Each link e=(u, v) corresponds to a maneuver m(u, v) and each link e is associated with a cost value cost(e). The cost value may represent the expected time for a vehicle to travel from location u to location v. For two gate points $g_1$ and $g_2$, the fastest route that takes the shortest amount of time from $g_1$ to $g_2$ in primal graph G may be determined as the shortest path from $g_1$ to $g_2$ in the maneuver graph M(G). The shortest path from $g_1$ to $g_2$ in the maneuver graph M(G) may be determined by any shortest path algorithm.

The cost(e) of a respective link e may be determined and stored, such as in memory. The cost(e) may be a single value for a respective link of the maneuver graph. Alternatively, multiple cost values for a respective link of a maneuver graph may be determined and stored in an example embodiment in which the cost value of a respective link is dependent upon one or more other parameters. For example, the cost(e) of a respective link may be time dependent with the cost(e) of a respective link depending upon the time of day, day of week or season of the year. Thus, multiple cost values for the respective link may be determined and stored with each cost value associated with a respective time value, such as a time of day, day of week or season of year.

Some of the maneuvers may be illegal or impermissible, such as due to time restrictions. The maneuver graph may reflect such an illegality in various manners. For example, a maneuver graph M(G) may not include a link for a maneuver that is illegal or otherwise impermissible. Alternatively, the maneuver graph may include a link representative of an illegal or otherwise impermissible maneuver, but the cost value associated with the illegal maneuver may be set to a large value, such as infinity. The use of a large, e.g., infinite, cost value may be advantageous in an instance in which a maneuver is only illegal in some circumstances, but not in other circumstances. For example, in an instance in which a turn in prohibited only between 9 a.m. and 5 p.m., the cost of the link representative of the turn maneuver may be infinite for the time period of 9 a.m. to 5 p.m., but may have a finite value during other time periods, such as from 5 p.m. to 9 a.m.

A maneuver may be graphically represented as shown, for example, in FIG. 4. In this regard, a maneuver m($g(e_1)$, $g(e_2)$) includes both a first link $e_1$=(u, v) and a second link $e_2$=(v, w). For each link e, a gate line is defined that is perpendicular to the link e and is symmetric with respect to the link e, that is, the gate line extends in equal distance from link e in each of the opposed perpendicular directions. The gate line intersects the link e at the gate point g(e). As noted above, the gate point g(e) of a link e may be defined in various manners, but is located at the midpoint of link e in an example embodiment. For a maneuver that begins at node u and is completed at node w, the gate line of link $e_1$ may be termed the entry gate line $\phi(e_1)$ and the gate line for link $e_2$ may be termed the exit gate line $\phi(e_2)$. Moreover, the portion of link $e_1$ between gate point $g(e_1)$ and node v is termed the inbound section 20 of the maneuver, while the portion of link $e_2$ between node v and gate point $g(e_2)$ is termed the outbound section 22 of the maneuver. It is noted, however, that a gate line may be the entry gate line for one maneuver, but the exit gate line from another maneuver depending upon the order in which a trajectory traverses the links.

The road network represented by a maneuver graph may include roads with different numbers of lanes and lanes of different widths. In addition, the location of a vehicle traveling along a road may be identified to a very tolerance defined by the position there associated with the positioning system, such as a global position system (GPS). Thus, the trajectory of a vehicle driving along a road does not necessarily fall precisely upon the link, but may be offset somewhat from the link due to the number of lanes of the road, the width of each lane of the road and the position error associated with the location with which the vehicle is defined. In order to identify trajectories that follow a maneuver, such as a turn from node u to node w, a distance threshold q(e) is defined for each link e. The distance threshold is a distance in a direction perpendicular to the respective link within which a vehicle will be considered to lie upon the link even though the location of the vehicle is determined to be slightly offset therefrom.

More specifically, a probe point is representative of the location of a vehicle at a respective point in time and may be collected while the vehicle traveling on link e. There is a high probability that the probe point is representative of a vehicle traveling on link e in an instance in which the probe point is within the distance threshold of the link e. Conversely, it is highly unlikely that the probe point is representative of a vehicle traveling on link e in an instance in which the probe point deviates from the link e by more than the distance threshold.

Each section of a maneuver may have the same distance threshold or different sections, such as the inbound section 20 and the outbound section 22, may have different distance thresholds. For example, the inbound section may have a different distance threshold than the outbound section in an instance in which the inbound section has a different number of lanes than the outbound section or in an instance in which the width of the lanes of the inbound section is different than the width of the lanes of the outbound section.

The distance threshold may be defined in various manners. In an example embodiment, however, the distance threshold is dependent upon the number of lanes of the respective section of road, the width of the lanes of the respective section of road and the positioning error associated with the probe points. For example, the distance threshold for a section may be defined as follows: $q(e)=(n \cdot w + 4R)/2$ in which n is the number of lanes and w is the width of the lanes. Thus, in an instance in which the positioning error follows a normal distribution with a standard deviation equal to R, the probability that the distance between a candidate probe point and a link e is smaller than the distance threshold under the condition that the probe point moves on the link e is more than 95%.

Utilizing a maneuver graph, such as depicted by way of example in FIG. 3, the travel time for a maneuver may be determined and thereafter utilized for purposes of route planning. In order to more accurately predict the travel time for a maneuver, the method, apparatus and computer program product of an example embodiment may selectively qualify trajectories for use in conjunction with the determination of the travel time for a respective maneuver. In this regard, an apparatus 10 may be provided in accordance with an example embodiment of the present invention for selectively qualifying a trajectory in regards to the determination of a travel time of a maneuver. One example of such an apparatus is depicted in FIG. 5, although the apparatus may be embodied in other manners in conjunction with other embodiments. The apparatus of an example embodiment may be embodied by or associated with a variety of computing devices including, for example, such as a navigation system including an in-vehicle navigation system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the apparatus may be embodied in other types of computing devices, such as a server, a personal computer, a computer workstation, a laptop computer, a plurality of networked computing devices or the like, that are configured to analyze probe points for route planning or other purposes. In this regard, FIG. 5 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

With reference now to FIG. 6, a flow chart illustrating the operations performed, such as by the apparatus 10 of FIG. 5, in order to selectively qualify a trajectory in regards to the determination of the travel time associated with a maneuver in accordance with an example embodiment are depicted. As shown in block 30 of FIG. 6, the apparatus 10 may include means, such as the processor 12 or the like, for defining the first and second gate lines $\phi(e_1)$ and $\phi(e_2)$, such as the entry and exit gate lines, based upon the respective distance threshold of at least one of the first section or the second section, e.g., the inbound section 20 or the outbound section 22. In this regard, the entry gate line proximate the inbound section of the maneuver will have a length that is based upon the distance threshold $q(e_1)$ of the inbound section, such as by having a length that is equal to 2 $q(e_1)$ of the inbound segment with the entry gate line extending perpendicularly outward from the link by a distance equal to the distance threshold $q(e_1)$ on each side of the link. Similarly, the exit gate line may have a length that is based upon the distance threshold $q(e_1)$ of the outbound section, such as by having a length equal to $2q(e_1)$ of the outbound section with the exit gate line extending outwardly from the link by a distance equal to the distance threshold in each of the opposed directions from the link. See, for example, FIG. 4 which depicts the first and second gate lines and the respective distance thresholds.

As shown in block 32 of FIG. 6, the apparatus 10 also includes means, such as the processor 12 or the like, for determining whether a trajectory intersects both the first and second gate lines $\phi(e_1)$ and $\phi(e_2)$ disposed at opposite ends of the maneuver. In this regard, the trajectory that is undergoing evaluation is comprised of a plurality of probe points captured as a vehicle traverses a road segment. Each probe point defines the location of the vehicle at a respective point in time. In order to determine whether the trajectory intersects a gate line, the trajectory may be constructed consisting of the plurality of probe points with line segments connecting the sequential probe points. In an instance in which a probe point lies upon a gate line or a line segment that extends between sequential probe points intersects the gate line, the processor determines that the gate line has been intersected by the trajectory. However, in instances in which the probe points do not lie upon a gate line and the line segments connecting the sequential probe points do not pass through the gate line, the processor is configured to determine that the trajectory does not intersect the respective gate line.

In an instance in which the travel time for a particular maneuver is to be determined, the determination that a trajectory does not intersect one or both of the entry and exit gate lines $\phi(e_1)$ and $\phi(e_2)$ of the maneuver may cause further processing of the trajectory to be terminated and to, instead, commence analysis of another trajectory, if another trajectory remains to be analyzed. See blocks 34, 36 and 38 of FIG. 6. However, in an instance in which the trajectory is determined to intersect both the first and second gate lines, the apparatus 10 includes means, such as the processor 12 or the like, for determining whether a candidate probe point is within a threshold distance of at least one of the sections of the maneuver, such as one of the first or second sections, e.g., the inbound or outbound sections. See block 40 of FIG. 6. In this regard, the processor of an example embodiment is configured to determine whether each candidate probe point of the trajectory is within a respective distance threshold of one of the sections of the maneuver. In order to determine whether a candidate probe point is within the threshold distance of a respective section of the maneuver, the processor is configured to determine the shortest distance from the candidate probe point to each of the sections of the maneuver and to then determine whether the distance from the candidate probe point to a respective section is less than or equal to the distance threshold for the respective section. By way of example, the first section, e.g., the inbound section 20, may be associated with a first distance threshold $q(e_1)$ and the second section, e.g., the outbound section 22, may be associated with the second distance threshold $q(e_2)$. Thus, the processor of this example embodiment is configured to determine whether the candidate probe point is within the first distance threshold of the first section or the second distance threshold of the second section.

As shown in blocks 42 and 44 of FIG. 6, the apparatus 10 also include means, such as the processor 12 or the like, for selectively identifying the trajectory as either a qualified trajectory or a disqualified trajectory in regards to the determination of a traveled time for the maneuver based upon whether the candidate probe point is determined to be within the respective distance threshold of at least one of the first section or the second section. In a instance in which a trajectory is identified as a qualified trajectory as a result of all of the candidate probe points of the trajectory being within a respective distance threshold of at least one of the sections of the maneuver, the travel time associated with the threshold is considered in regards to the determination of the travel time for the maneuver. However, in an instance in which a trajectory is identified to be a disqualified trajectory as a result of one or more of a candidate probe points that define the trajectory failing to satisfy the respective distance thresholds of each of the sections of the maneuver, the trajectory is not included in the determination of the travel time for the maneuver. In this regard, since the disqualified trajectory deviates from the link by an amount that exceeds the distance thresholds of the sections, the travel time associated with the disqualified trajectory is no longer considered representative of the travel time expended for the maneuver.

By way of further explanation in relation to FIG. 7, the apparatus 10 of an example embodiment includes means, such as the processor or the like, for determining a first time at which the trajectory intersects the first gate line $\phi(e_1)$, such as the entry gate line, and a second time at which the trajectory intersects the second gate line $\phi(e_2)$, such as the exit gate line. See blocks 50 and 52. In an instance in which a probe point coincides positionally with a gate line, the time at which the trajectory intersects the respective gate line is set equal to the time value of the probe point. Otherwise, the probe point immediately prior to the gate line and the probe point immediately following the gate line may be determined. Based on the relative location of the gate line to these probe points and the time values of these probe points, the time at which the trajectory intersects the gate line may be determined by interpolation between the time values of the probe points immediately prior to and immediately following the gate line.

The apparatus 10 of this example embodiment also includes means, such as the processor 12 or the like, for identifying each probe point of the trajectory that is associated with a time value that is between the first and second times as a candidate probe point. See block 54 of FIG. 7. The apparatus of this example embodiment further includes the means, such as the processor or the like, for separately determining for each candidate probe point whether the respective candidate probe point is within a respective distance threshold of at least one of the sections of the maneuver. In an instance in which each of the candidate probe points of the trajectory satisfies a respective distance threshold of at least one of the sections of the maneuver, the apparatus includes means, such as the processor or the like, for identifying the trajectory as a qualified trajectory. Conversely, the apparatus of this example embodiment also includes means, such as the processor or the like, for identifying the trajectory as a disqualified trajectory in an instance in which at least one of the candidate probe points of the trajectory fails to satisfy a respective distance threshold of one or more of the sections of the maneuver.

For example, FIG. 8 depicts a maneuver that includes four candidate probe points between the entry and exit gate lines $\phi(e_1)$ and $\phi(e_2)$. In this example embodiment, each candidate probe point is within the distance threshold of a respective section of the maneuver. Indeed, the distance threshold $q(e_1)$ associated with the first section is represented by the distance that the entry gate line extends outward from the link, while the greater distance threshold $q(e_2)$ associated with the second section is represented by the distance that the exit gate line extends outward from the respective link. Thus, the first and second candidate probe points 60, 62 are within the first distance threshold associated with the first section, while the third and fourth candidate probe points 64 and 66 are within the second distance threshold associated with the second section. Consequently, the apparatus 10, such as the processor 12, is configured to identify the trajectory depicted in FIG. 8 as a qualified trajectory in regards to the subsequent determination of the travel time for the maneuver. However, the maneuver depicted in FIG. 9 does not follow the links as closely and, as a result, is identified as a disqualified link. In this regard, the first and second candidate probe points 70, 72 remain within the first distance threshold of the first segment and the fifth and sixth probe points 78, 80 remain within the second distance threshold of the second segment. However, the third and fourth candidate probe points 74, 76 do not satisfy either the first distance threshold of the first segment or the second distance threshold of the second segment. As a result, the apparatus, such as the processor, identifies the trajectory as a disqualified trajectory which is not taken into account any determination of the travel time for the maneuver.

In the foregoing example embodiment, the failure of any one of the candidate probe points to satisfy the distance thresholds of the sections of a maneuver causes the trajectory to be identified as a disqualified trajectory. In other embodiments, however, the apparatus 10, such as the processor 12, may be configured such that either a predetermined number of candidate probe points or a predetermined percentage of the candidate probe points must fail to satisfy the distance thresholds of the sections of the maneuver prior to selectively identifying the trajectory as a disqualified trajectory. Thus, in an embodiment in which the processor requires two or more of the candidate probe points to fail to satisfy the distance thresholds of the sections of the maneuver prior to identifying the trajectory as a disqualified trajectory, the failure of a single candidate probe point, such as an outlier, to satisfy the distance thresholds of the sections of the maneuver will not cause the trajectory to be disqualified.

Some intersections may have relatively large geo-spatial extensions. In such instances, the representation of such an intersection as a single node in the primal graph G may impair the accuracy of the resulting graph G. Thus, an intersection, such as an intersection having a relatively large geo-spatial extension, may be represented by multiple nodes connected by internal links. The nodes that belong to the same intersection may be termed related nodes. In addition, given two links $e_1=(a, b)$ and $e_2=(c, d)$, links $e_1$ and $e_2$ are termed intersection—adjacent links if b=c, that is, the links share a common node. For a maneuver that proceeds from link $e_1$ to link $e_2$, link e1 is termed the predecessor of link $e_2$ and link $e_2$ is termed the successor of link $e_1$.

By way of example of a more complex intersection, FIG. 10 illustrates an intersection represented by a set of related nodes A, B, C, D, E. The dashed links are internal links. Link $L_2$ and link $L_1$ are intersection-adjacent links, as are link $L_3$ and link $L_1$, and link $L_4$ and link $L_1$. Links $L_2$, $L_3$ and $L_4$ are successors of link $L_1$, while link $L_1$ is a predecessor of links $L_2$, $L_3$ and $L_4$.

For a primal graph G with internal links, gate points are designated only at non-internal links, that is, there are no gate points are included at the internal links. In this regard, FIG. 11 depicts the gate points as solid circles a, b, c, d, e, f, g and h. A maneuver may then be derived for each pair of intersection-adjacent links. For a given pair of intersection-adjacent links $e_1$ and $e_2$ in which $e_2$ is a successor of $e_1$, the maneuver $m(g(e_1), g(e_2))$ is the shortest path in the primal graph G starting from gate point $g(e_1)$ and extending to gate point $g(e_2)$. FIG. 11 depicts two maneuvers, namely, m(a, d) and maneuver m(g, h). By way of example, the maneuver graph derived from the primal graph G of the complex intersection of FIG. 11 is depicted in FIG. 12.

Once the maneuvers through a complex intersection have been derived, the selective identification of trajectories that extend through the intersection as either a qualified trajectory or a disqualified trajectory proceeds as described above, albeit with the determination of distance thresholds for each internal link and the separate analysis of the satisfaction of the distance thresholds of the internal links in conjunction with the selective identification of the trajectory as either a qualified trajectory or a disqualified trajectory. In this regard, a maneuver includes not only a first section and a second section, that is, inbound and outbound sections, but also one or more internal links between the first and second sections. As such, the apparatus 10 includes means, such as the processor 12 or the like, for determining whether a candidate probe point is within a respective distance threshold of at least one or the first or second sections or the one or more internal links. See block 90 of FIG. 13. Thus, even in an instance in which a candidate probe point is not within the respective distance threshold of the first and second sections, the candidate probe point may be determined to be within the respective distance threshold of one or more of the internal links of the intersection. In this example embodiment, the apparatus also includes means, such as the processor or the like, for selectively identifying the trajectory as a qualified trajectory or a disqualified trajectory based upon whether the candidate probe point is determined to be within the respective distance threshold of at least one of the first or second sections or the one or more internal links. See blocks 92 and 94 of FIG. 13. Thus, even in an instance in which the candidate probe point is determined to not be within the respective distance thresholds of the first and second sections, but is determined to be within the respective distance threshold of one or more of the internal links, the trajectory may be identified as a qualified trajectory in an instance in which each candidate probe point is determined to be within the respective distance threshold of at least one of sections, that is, the first or second sections or the one or more internal links.

By way of example, FIG. 14 depicts a trajectory that extends from node a to node d of the complex intersection of FIG. 10 with the candidate probe points being within a respective distance threshold of either the inbound or outbound sections or one or more internal links. In this regard, the first candidate probe point 100 is within the distance threshold of the inbound segment 20 and the fifth candidate probe point 108 is within the distance threshold of the outbound section 22. While the second, third and fourth candidate probe points are outside the respective distance thresholds for the inbound and outbound sections, the second candidate probe point 102 is within the respective distance threshold of the first internal link and the third and fourth candidate probe points 104, 106 are within the respective distance threshold of the second internal link. As noted above, each of the first and second sections and the internal links may have different distance thresholds or a common distance threshold.

For each of a plurality of trajectories, the foregoing process is repeated as indicated by blocks 38 and 46 of FIG. 6 with trajectories being selectively identified as either qualified trajectories or disqualified trajectories in the manner described above. Once each trajectory has been identified as either a qualified trajectory or a disqualified trajectory, the apparatus 10, such as the processor 12, is configured to determine the travel time for the maneuver based upon the qualified trajectories, without further consideration of the disqualified trajectories. See block 48 of FIG. 6. In this regard, the travel time for each of the qualified trajectories may be summed with the sum then being divided by the total number of qualified trajectories in order to determine the average travel time for the maneuver.

By basing the travel time of the maneuver upon trajectories that have been qualified and not upon trajectories that have been disqualified, the resulting travel time may more accurately represent the travel time of the maneuver for route planning or other purposes. This accuracy is further enhanced by avoiding double counting of delays incurred by turns at an intersection. Additionally, the method, apparatus and computer program product of an example embodiment avoid the costs associated with deploying and maintaining fixed sensors may be avoided.

As described above, the trajectories are commonly constructed from a plurality of road sections prior to being analyzed for a determination of travel time. For privacy considerations, trajectories may be represented by relatively small road sections. In this regard, a privacy policy may restrict trajectories utilized for the determination of travel time to be no longer than a trajectory that would be traveled in five minutes. For road links that are very long, very few, if any, trajectories may be determined to have traveled the road link, thereby resulting in difficulties associated with the determination of travel time via the road link. Thus, a relatively long road link may be broken into multiple sections such that there are sufficient trajectories that travel each section to determine the travel time. Consequently, extra nodes may be introduced in a relatively long road link in order to define additional road sections.

The apparatus 10 of an example embodiment may be employed in conjunction with various real time end user applications including a real time navigation system. For example, a navigation system may operate in real time to determine a route from an origin to a destination and to determine an estimated time that will be required to traverse the route and/or an estimated time of arrival. In conjunction with the determination of the estimated times, the apparatus of an example embodiment may determine the maneuver time to execute one or more turns at respective intersections along the route. Since the time expended to execute one or more turns can be computed more accurately, the navigation system of this example embodiment may correspondingly more accurately estimate the time that will be required to traverse the route as well as an estimated time of arrival.

In addition to embodying the apparatus 10 of an example embodiment, a navigation system may also include or have access to a geographic database that includes a variety of data utilized in constructing a route and determining the time to traverse the route. For example, a geographic database may include node data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately. As described above, FIGS. 6, 7 and 13 illustrate flowcharts of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method of a navigation system to determine travel time, the method comprising:
representing a road network with a set of links and defining a maneuver to have first and second gate lines that intersect respective links at respective gate points and that extend outwardly from the respective links;
determining, with a processor of the navigation system, whether a trajectory intersects both first and second gate lines disposed at opposite ends of the maneuver, wherein the maneuver is comprised of at least first and second sections;
in an instance in which the trajectory intersects both the first and second gate lines, determining, with the processor of the navigation system, whether a candidate probe point is within a respective distance threshold of at least one of the first section or the second section, wherein the distance threshold of a respective section is dependent upon at least a number of lanes of the respective section;
selectively identifying, with the processor of the navigation system, the trajectory as either a qualified trajectory or a disqualified trajectory in regards to a determination of a travel time for the maneuver based upon whether the candidate probe point is determined to be within the respective distance threshold of at least one of the first section or the second section, wherein the travel time is determined without consideration of the disqualified trajectory; and
estimating a time to traverse a route or to arrive at a destination based at least in part upon the travel time for the maneuver,
wherein the method further comprises defining the first and second gate lines to extend outwardly from the respective links by a distance that is based upon the respective distance threshold of at least one of the first section or the second section that is dependent upon at least the number of lanes of the respective section, and wherein the first gate line is defined so as to extend outwardly in a first equal distance in each of two opposed directions from a first link and the second gate line is defined to extend outwardly in a second equal distance in each of two opposed directions from a second link.

2. A method according to claim 1 wherein the first section is associated with a first distance threshold and the second section is associated with a second distance threshold, and wherein determining whether a candidate probe point is within a respective distance threshold of at least one of the first section or the second section comprises determining whether the candidate probe point is within at least one of the first distance threshold of the first section or the second distance threshold of the second section.

3. A method according to claim 1 further comprising:
determining a first time at which the trajectory intersects the first gate line and a second time at which the trajectory intersects the second gate line; and
identifying each probe point of the trajectory that is associated with a time value that is between the first and second times as a candidate probe point.

4. A method according to claim 3 wherein determining whether a candidate probe point is within a respective distance threshold of at least one of the first section or the second section comprises separately determining for each candidate probe point whether the respective candidate probe point is within a respective distance threshold of at least one of the first section or the second section, and wherein selectively identifying the trajectory as either a qualified trajectory or a disqualified trajectory comprises identifying the trajectory as a qualified trajectory in an instance in which each of the candidate probe points of the trajectory satisfies a respective distance threshold and identifying the trajectory as a disqualified trajectory in an instance in which at least one of the candidate probe points of the trajectory fails to satisfy a respective distance threshold.

5. A method according to claim 1 wherein the distance threshold is further dependent upon at least a width of each lane of the respective section.

6. A method according to claim 1 wherein the maneuver is further comprised of one or more internal links disposed between the first and second sections, wherein determining whether a candidate probe point is within a respective distance threshold of at least one of the first section or the second section comprises determining whether the candidate probe point is within a respective distance threshold of at least one of the first or second sections or the one or more internal links, and wherein selectively identifying the trajectory as either a qualified trajectory or a disqualified trajectory comprises selectively identifying the trajectory as either a qualified trajectory or a disqualified trajectory based upon whether the candidate probe point is determined to be within the respective distance threshold of at least one of the first or second sections or the one or more internal links.

7. A navigation system comprising at least one processor and at least one memory storing computer program code, the at least one memory and the computer program code configured to, with the processor, cause the navigation system to at least:
represent a road network with a set of links and define a maneuver to have first and second gate lines that intersect respective links at respective gate points and that extend outwardly from the respective links;
determine whether a trajectory intersects both first and second gate lines disposed at opposite ends of the maneuver, wherein the maneuver is comprised of at least first and second sections;
in an instance in which the trajectory intersects both the first and second gate lines, determine whether a candidate probe point is within a respective distance threshold of at least one of the first section or the second section, wherein the distance threshold of a respective section is dependent upon at least a number of lanes of the respective section;
selectively identify the trajectory as either a qualified trajectory or a disqualified trajectory in regards to a determination of a travel time for the maneuver based upon whether the candidate probe point is determined to be within the respective distance threshold of at least one of the first section or the second section, wherein the travel time is determined without consideration of the disqualified trajectory; and estimate a time to traverse a route or to arrive at a destination based at least in part upon the travel time for the maneuver, wherein the at least one memory and the computer program code are further configured to, with the processor, cause the navigation system to define the first and second gate lines to extend outwardly from the respective links by a distance that is based upon the respective distance threshold of at least one of the first section or the second section that is dependent upon at least the number of lanes of the respective section, and wherein the first gate line is defined so as to extend outwardly in a first equal distance in each of two opposed directions from a first link and the second gate line is defined to extend outwardly in a second equal distance in each of two opposed directions from a second link.

8. A navigation system according to claim 7 wherein the first section is associated with a first distance threshold and the second section is associated with a second distance threshold, and wherein the at least one memory and the computer program code are configured to, with the processor, cause the navigation system to determine whether a candidate probe point is within a respective distance threshold of at least one of the first section or the second section by determining whether the candidate probe point is within at least one of the first distance threshold of the first section or the second distance threshold of the second section.

9. A navigation system according to claim 7 the at least one memory and the computer program code are further configured to, with the processor, cause the navigation system to:

determine a first time at which the trajectory intersects the first gate line and a second time at which the trajectory intersects the second gate line; and identify each probe point of the trajectory that is associated with a time value that is between the first and second times as a candidate probe point.

10. A navigation system according to claim 9 wherein the at least one memory and the computer program code are configured to, with the processor, cause the navigation system to determine whether a candidate probe point is within a respective distance threshold of at least one of the first section or the second section by separately determining for each candidate probe point whether the respective candidate probe point is within a respective distance threshold of at least one of the first section or the second section, and wherein the at least one memory and the computer program code are configured to, with the processor, cause the navigation system to selectively identify the trajectory as either a qualified trajectory or a disqualified trajectory by identifying the trajectory as a qualified trajectory in an instance in which each of the candidate probe points of the trajectory satisfies a respective distance threshold and identifying the trajectory as a disqualified trajectory in an instance in which at least one of the candidate probe points of the trajectory fails to satisfy a respective distance threshold.

11. A navigation system according to claim 7 wherein the distance threshold is further dependent upon at least a width of each lane of the respective section.

12. A navigation system according to claim 7 wherein the maneuver is further comprised of one or more internal links disposed between the first and second sections, wherein the at least one memory and the computer program code are configured to, with the processor, cause the navigation system to determine whether a candidate probe point is within a respective distance threshold of at least one of the first section or the second section by determining whether the candidate probe point is within a respective distance threshold of at least one of the first or second sections or the one or more internal links, and wherein the at least one memory and the computer program code are configured to, with the processor, cause the navigation system to selectively identify the trajectory as either a qualified trajectory or a disqualified trajectory by selectively identifying the trajectory as either a qualified trajectory or a disqualified trajectory based upon whether the candidate probe point is determined to be within the respective distance threshold of at least one of the first or second sections or the one or more internal links.

13. A computer program product of a navigation system to determine travel time, the computer program product comprising at least one non-transitory computer-readable storage medium having computer-executable program code instructions stored therein, the computer-executable program code instructions comprising program code instructions configured, upon execution by the navigation system, to:

represent a road network with a set of links and define a maneuver to have first and second gate lines that intersect respective links at respective gate points and that extend outwardly from the respective links;

determine whether a trajectory intersects both first and second gate lines disposed at opposite ends of the maneuver, wherein the maneuver is comprised of at least first and second sections;

in an instance in which the trajectory intersects both the first and second gate lines, determine whether a candidate probe point is within a respective distance threshold of at least one of the first section or the second section, wherein the distance threshold of a respective section is dependent upon at least a number of lanes of the respective section;

selectively identify the trajectory as either a qualified trajectory or a disqualified trajectory in regards to a determination of a travel time for the maneuver based upon whether the candidate probe point is determined to be within the respective distance threshold of at least one of the first section or the second section, wherein the travel time is determined without consideration of the disqualified trajectory; and estimate a time to traverse a route or to arrive at a destination based at least in part upon the travel time for the maneuver, wherein the computer-executable program code instructions further comprise program code instructions configured, upon execution by the navigation system, to define the first and second gate lines to extend outwardly from the respective links by a distance that is based upon the respective distance threshold of at least one of the first section or the second section that is dependent upon at least the number of lanes of the respective section, and wherein the first gate line is defined so as to extend outwardly in a first equal distance in each of two opposed directions from a first link and the second gate line is defined to extend outwardly in a second equal distance in each of two opposed directions from a second link.

14. A computer program product according to claim 13 wherein the first section is associated with a first distance threshold and the second section is associated with a second distance threshold, and wherein the program code instructions configured to determine whether a candidate probe point is within a respective distance threshold of at least one of the first section or the second section comprise program code instructions configured to determine whether the candidate probe point is within at least one of the first distance threshold of the first section or the second distance threshold of the second section.

15. A computer program product according to claim 13 wherein the computer-executable program code instructions further comprise program code instructions configured to:
   determine a first time at which the trajectory intersects the first gate line and a second time at which the trajectory intersects the second gate line; and
   identify each probe point of the trajectory that is associated with a time value that is between the first and second times as a candidate probe point.

16. A computer program product according to claim 15 wherein the program code instructions configured to determine whether a candidate probe point is within a respective distance threshold of at least one of the first section or the second section comprise program code instructions configured to separately determine for each candidate probe point whether the respective candidate probe point is within a respective distance threshold of at least one of the first section or the second section, and wherein the program code instructions configured to selectively identify the trajectory as either a qualified trajectory or a disqualified trajectory comprise program code instructions configured to identify the trajectory as a qualified trajectory in an instance in which each of the candidate probe points of the trajectory satisfies a respective distance threshold and identifying the trajectory as a disqualified trajectory in an instance in which at least one of the candidate probe points of the trajectory fails to satisfy a respective distance threshold.

17. A computer program product according to claim 13 wherein the distance threshold is further dependent upon at least a width of each lane of the respective section.

18. A computer program product according to claim 13 wherein the maneuver is further comprised of one or more internal links disposed between the first and second sections, wherein the program code instructions configured to determine whether a candidate probe point is within a respective distance threshold of at least one of the first section or the second section comprise program code instructions configured to determine whether the candidate probe point is within a respective distance threshold of at least one of the first or second sections or the one or more internal links, and wherein the program code instructions configured to selectively identify the trajectory as either a qualified trajectory or a disqualified trajectory comprise program code instructions configured to selectively identify the trajectory as either a qualified trajectory or a disqualified trajectory based upon whether the candidate probe point is determined to be within the respective distance threshold of at least one of the first or second sections or the one or more internal links.

19. A method according to claim 1 wherein the first equal distance by which the first gate line extends outwardly in each of two opposed directions from the first link is different than the second equal distance by which the second gate line extends outwardly in each of two opposed directions from the second link.

20. A navigation system according to claim 7 wherein the first equal distance by which the first gate line extends outwardly in each of two opposed directions from the first link is different than the second equal distance by which the second gate line extends outwardly in each of two opposed directions from the second link.

21. A computer program product according to claim 13 wherein the first equal distance by which the first gate line extends outwardly in each of two opposed directions from the first link is different than the second equal distance by which the second gate line extends outwardly in each of two opposed directions from the second link.

* * * * *